US007690569B2

(12) United States Patent
Swanson et al.

(10) Patent No.: US 7,690,569 B2
(45) Date of Patent: Apr. 6, 2010

(54) WIRELESS DATA LOGGING SYSTEM AND METHOD

(75) Inventors: Gregory Swanson, Inver Grove Heights, MN (US); Rudrava Roy, Minneapolis, MN (US)

(73) Assignee: Datafleet, Inc., Minneapolis, MN (US)

( * ) Notice: Subject to any disclaimer, the term of this patent is extended or adjusted under 35 U.S.C. 154(b) by 122 days.

(21) Appl. No.: 11/749,746

(22) Filed: May 16, 2007

(65) Prior Publication Data

US 2007/0268128 A1  Nov. 22, 2007

Related U.S. Application Data

(60) Provisional application No. 60/800,809, filed on May 16, 2006.

(51) Int. Cl.
*G06K 7/00* (2006.01)

(52) U.S. Cl. ............. 235/440; 340/539.13; 340/539.22; 340/522

(58) Field of Classification Search ........................ None
See application file for complete search history.

(56) References Cited

U.S. PATENT DOCUMENTS

| | | | | |
|---|---|---|---|---|
| 4,538,072 A | * | 8/1985 | Immler et al. | ............... 250/568 |
| 4,542,528 A | * | 9/1985 | Sanner et al. | ............... 382/318 |
| 4,599,745 A | * | 7/1986 | Baran et al. | ................. 398/104 |
| 4,877,948 A | * | 10/1989 | Krueger | ...................... 235/449 |
| 5,132,968 A | | 7/1992 | Cephus | |
| 5,559,849 A | * | 9/1996 | Bruijns | ...................... 378/98.2 |
| 5,959,529 A | | 9/1999 | Kail, IV | |
| 6,224,549 B1 | * | 5/2001 | Drongelen | .................. 600/300 |
| 6,285,955 B1 | | 9/2001 | Goldwasser | |
| 6,357,658 B1 | * | 3/2002 | Garczynski et al. | ..... 235/462.01 |
| 6,490,872 B1 | * | 12/2002 | Beck et al. | ...................... 62/66 |
| 6,505,778 B1 | * | 1/2003 | Reddersen et al. | ...... 235/462.25 |
| 6,614,235 B2 | * | 9/2003 | Kraz | .......................... 324/457 |
| 6,970,183 B1 | | 11/2005 | Monroe | |
| 7,158,797 B1 | | 1/2007 | Jayaraman et al. | |
| 7,292,878 B2 | * | 11/2007 | Noguchi et al. | ............. 455/563 |
| 2002/0057217 A1 | * | 5/2002 | Milnes et al. | .......... 342/357.07 |
| 2003/0121981 A1 | * | 7/2003 | Slutsky et al. | .......... 235/462.45 |
| 2004/0103139 A1 | | 5/2004 | Hubbard et al. | |
| 2006/0146469 A1 | | 7/2006 | Heagerty et al. | |
| 2006/0231628 A1 | * | 10/2006 | Wei | ......................... 235/462.3 |

* cited by examiner

*Primary Examiner*—Michael G Lee
*Assistant Examiner*—Suezu Ellis
(74) *Attorney, Agent, or Firm*—Dicke, Billig & Czaja, PLLC

(57) ABSTRACT

A data acquisition system including a first sensor, a second sensor, and an electronic data acquisition device. The sensors can assume a variety of forms, such as analog, digital, bus, GPS, etc., and have disparate information formats. The data acquisition unit is electronically coupled to the sensors, and includes a processor, an aggregator module and a communication device. The processor processes information from the sensors. The aggregator module correlates signaled information from the first sensor with signaled information from the second sensor based on time. Finally, the communication device is adapted to transmit information generated by the aggregator module to a location remote of the housing.

27 Claims, 9 Drawing Sheets

WIRELESS DATA LOGGING SYSTEM AND METHOD

CROSS-REFERENCE TO RELATED APPLICATIONS

This application claims priority under 35 U.S.C. §119(e)(1) to U.S. Provisional Patent Application Ser. No. 60/800,809, filed May 16, 2006, entitled "Wireless Vehicle Data Logging System and Method," the teachings of which is hereby incorporated by reference.

BACKGROUND

The present invention relates to systems for logging, managing, and reporting data relating to operational parameters associated with a device. More particularly, it relates to systems and methods for recording, in an unobtrusive manner, operational parameters associated with a device such as a vehicle, machine, product, etc., and reporting the logged information to a central location, for example via wireless communication.

Manufacturers and users of many different devices oftentimes have a strong interest in understanding how the device is operated and/or how the device performs. Some examples of such an application are vehicles. The types of vehicles for which operational/performance information is of value are wide-ranging, for example trucks, automobiles, construction equipment, buses, recreation vehicles (e.g., snow mobiles, all-terrain vehicles, watercraft), agricultural implements, etc., to name but a few. Operational and/or performance information is also highly desirable for a plethora of other devices, ranging from industrial equipment (e.g., pumps, machinery, etc.) to personal products such as bicycles and lawn mowers. Regardless, while it may be possible for the actual user to manually record some parameters of interest, this approach is highly susceptible to human error. Further, persons other than the user or operator do not have direct access to recorded information. Also, many operational parameters of interest are simply not readily available to the user and/or cannot be consistently recorded over short intervals.

In light of the above, it has been suggested to provide a data acquisition unit, or data logger, with the device in question. In general terms, the data acquisition unit records information from a sensor associated with the device for subsequent retrieval and analysis. Conventional data loggers simply store the information in an on-board memory that must be directly, electronically linked (i.e., hard wired) to a separate computing device in order to view the stored information, and oftentimes requires physical removal of the data acquisition unit from the device. This represents a distinct drawback. Further, many conventional data acquisition systems come equipped with a single, specific sensor that, while appropriate for one device to be monitored, is of little or no value for any other device, thus overtly limiting the overall applicability of the system. Along these same lines, the data acquisition unit is oftentimes only able to capture data from a single sensor over discrete time intervals (e.g., where multiple sensors are provided, information is stored for only one of the sensors at any point in time), thus raising another system limitation. Pointedly, the seemingly endless improvements to sensors (in terms of, for example, parameters able to be sensed, sensing or sampling rates, etc.) have negatively impacted the viability of conventional data acquisition units in that the ability to record meaningful information over extended periods of time is not possible, especially for small sized device applications in which a large memory unit cannot be employed.

Certain devices present additional, currently unmet, constraints upon the data acquisition unit. For example, for many vehicle applications, simply connecting or assembling a sensor to the vehicle's operational equipment (e.g., motor, common area network vehicle bus, etc.) along with a memory for recording sensed data is not a viable option. In particular, many vehicles operate under rugged conditions (e.g., temperature, high humidity, exposure to water or snow, etc.), dictating that the sensor/associated memory cannot be left unprotected. Additionally, for the operational information to be of real value, a number of parameters must be monitored, and thus an array of different sensors and/or data sources are required. In many instances, the vehicle operator and/or owner will simply not accept a system configuration in which multiple sensors are randomly assembled to various locations about the vehicle's motor. Similar footprint-type constraints are raised by many other devices for which operational monitoring is desired.

In light of the above, a need exists for systems and methods for unobtrusively logging device operational parameters from multiple, discrete sensor sources and transmitting this data to and organizing the data at or within a central location.

SUMMARY

Some aspects in accordance with principles of the present disclosure relate to a data acquisition system including a first sensor, a second sensor, and an electronic data acquisition device. The sensors can assume a variety of forms, such as analog, digital, bus (e.g., CAN, serial), GPS, other data sources, etc. Regardless, the first sensor senses a first parameter and signals sensed information in a first format, whereas the second sensor senses a second parameter and signals sensed information in a second format differing from the first format. The data acquisition unit is electronically coupled to the sensors (and other data sources where provided), and includes a housing maintaining a processor, an aggregator module and a communication device. The processor is programmed to process signaled information from the sensors, and is in electronic communication with the aggregator module and the communication device. In this regard, the aggregator module is programmed to correlate signaled information from the first sensor with signaled information from the second sensor based on time. Finally, the communication device is adapted to transmit information generated by the aggregator module to a location remote of the housing. In some embodiments, the first format is characterized by a faster sampling rate as compared to a sampling rate of the second format, and the aggregator module is programmed to group or summarize signaled information from the first sensor over a designated time interval. In other embodiments, the data acquisition unit further includes an event module programmed to detect occurrence of a predetermined event and prompt storing of a more complete data stream from one or more of the sensors in response to the event.

DETAILED DESCRIPTION

Figure 1:
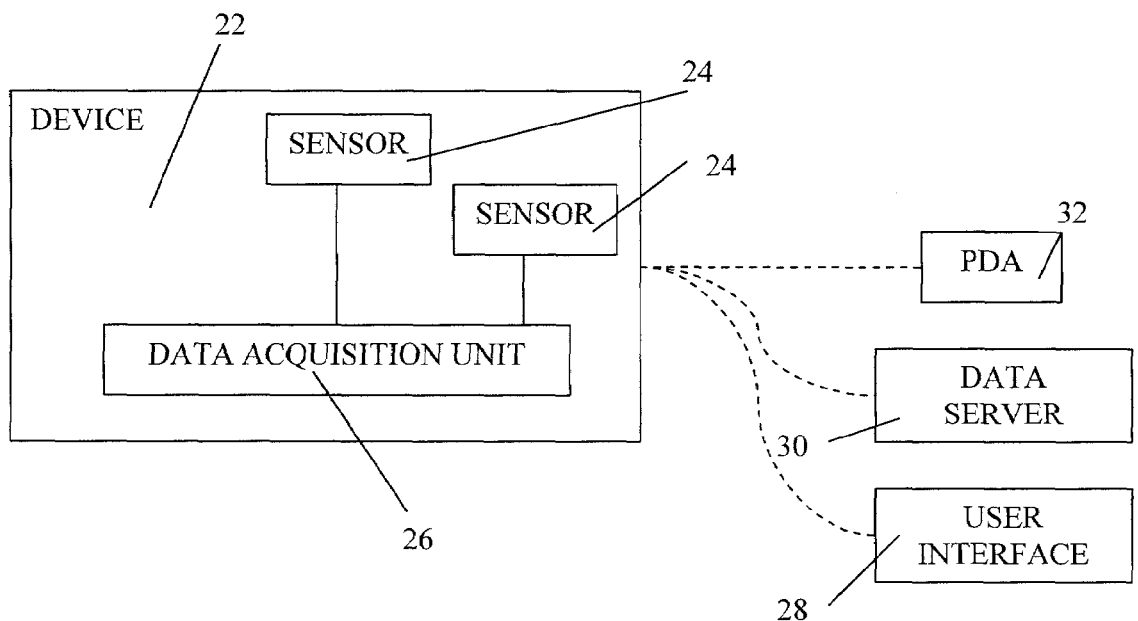
FIG. 1 is a block diagram of a data acquisition system in accordance with aspects of the present disclosure.

One embodiment of an electronic data acquisition system 20 in accordance with aspects of the present disclosure is shown in block form FIG. 1. The system 20 is operable upon a device 22 (referenced generally), and includes two or more sensors 24, a data acquisition unit 26, a user interface 28, a data server 30, and optionally one or more additional personal communication device(s) 32. Details on the various components are provided below. In general terms, however, the sensors 24 sense information indicative of one or more operational parameters associated with operation or use of the device 22, with the sensed information being signaled to the data acquisition unit 26. The data acquisition unit 26, in turn, records the signaled information in a manner described below. Stored and/or acquired information is delivered from the data acquisition unit 26 to the user interface 28 periodically and/or on a real time basis for subsequent review by a user (not shown). In this regard, the user interface 28 can be operated by a user to selectively prompt delivery of information in a desired manner from the acquisition unit 26, as well as to control configuration and operation of the data acquisition unit 26 via user-entered commands. Additionally, the data server 30 serves as a central location for permanent storage and organization of information from the data acquisition unit 26, available for viewing by a user in a scheduled or ad-hoc fashion (e.g., via the user interface 28). Further, the communications device 32 (e.g., cell phone or PDA), where provided, can be employed to view data from the data acquisition unit 26; in some embodiments, the system 20 is configured such that the data acquisition unit 26 automatically delivers information to the communications device 32 when the acquired information meets a certain, predetermined criteria or event.

As a point of reference, the system 20 is useful with a wide range of different device 22 types. For example, the device 22 can be a vehicle such as a snowmobile, a tractor, construction equipment, a bus, an all-terrain vehicle, etc. Alternatively, the device 22 can be industrial machinery (e.g., a pump), a power tool, an agricultural implement, a lawn mower, a bicycle, etc., to name but a few. It should be understood, however, that the system 20 can be used with a wide variety of other devices not otherwise specifically mentioned.

As described in greater detail below, in some embodiments, the data acquisition unit 26 is adapted to process and store information from a plurality of discrete or disparate sensors, two or more of which generate or signaling data in a unique format. With this in mind, the sensors 24 generally reflected in FIG. 1 can assume a wide variety of forms currently available or in the future developed, appropriate for the device 22 being monitored (in terms of, for example, physical construction of the device 22, operational parameters of interest, etc.). Thus, one or more of the sensors 24 can be an analog-type sensor (e.g., signaling data indicative of a sensed parameter in analog form) such as temperature sensors, pressure sensors, acceleration sensors, flow sensors, vibration sensors, torque sensors, force sensors, strain gauges or sensors, load sensors, voltage sensors, amperage sensors, etc. Additionally or alternatively, one or more of the sensors 24 can be a digital-type sensor (e.g., signaling data indicative of a sensed parameter in digital form) such as proximity sensors, limit switches, etc. Even further, one or more of the sensors 24 can be other forms of data sources such as a Global Positioning System (GPS) receiver or a device-specific data source or bus architecture such as a vehicle bus (e.g., common area network (CAN) vehicle bus) that can communicate with the processor 42 over any established communication technology (e.g., CAN, RS232, RS485, I2C, etc.). Regardless, one or more of the sensors 24 can be provided apart from the device 22 to be monitored (e.g., as a component of the data acquisition unit 26) and subsequently assembled thereto along with the data acquisition unit 26 (e.g., a GPS receiver), can be a sensor initially provided apart from both of the device 22 and data acquisition unit 26 and subsequently assembled thereto, or can be a sensor initially provided with the device 22 to be monitored and simply electronically coupled to the acquisition unit 26 as part of the device 22/acquisition unit 26 assembly (e.g., a engine control unit (ECU) provided with a vehicle as generating data via a CAN vehicle bus).

Regardless of sensor type, two or more of the sensors 24 employed with the system 20 can generate or signal information in a differing format. For example, an analog sensor will signal information in analog form, such as in terms of voltage, whereas a digital sensor will signal information in digital form, such as in terms of 1 or 0. GPS and CAN sensors signal information in yet other formats that are typically unique message protocols. Even further, the disparate sensor information formats can differ in other manners, for example in terms of actual or available sampling rate (as dictated, for example, by an A/D converter board associated with the data acquisition unit 10). For example, a first, analog sensor format may have an available sampling rate on the order of 5 kHz, a second, GPS sensor format may have an available sampling rate on the order of 1 Hz, and a third, serial bus sensor format may have an available sampling rate on the order of 50 Hz. As described below, the data acquisition unit 26 is configured to correlate the disparate sensor data, for example based on time, in creating meaningful representation of device 22 operation.

Figure 2:
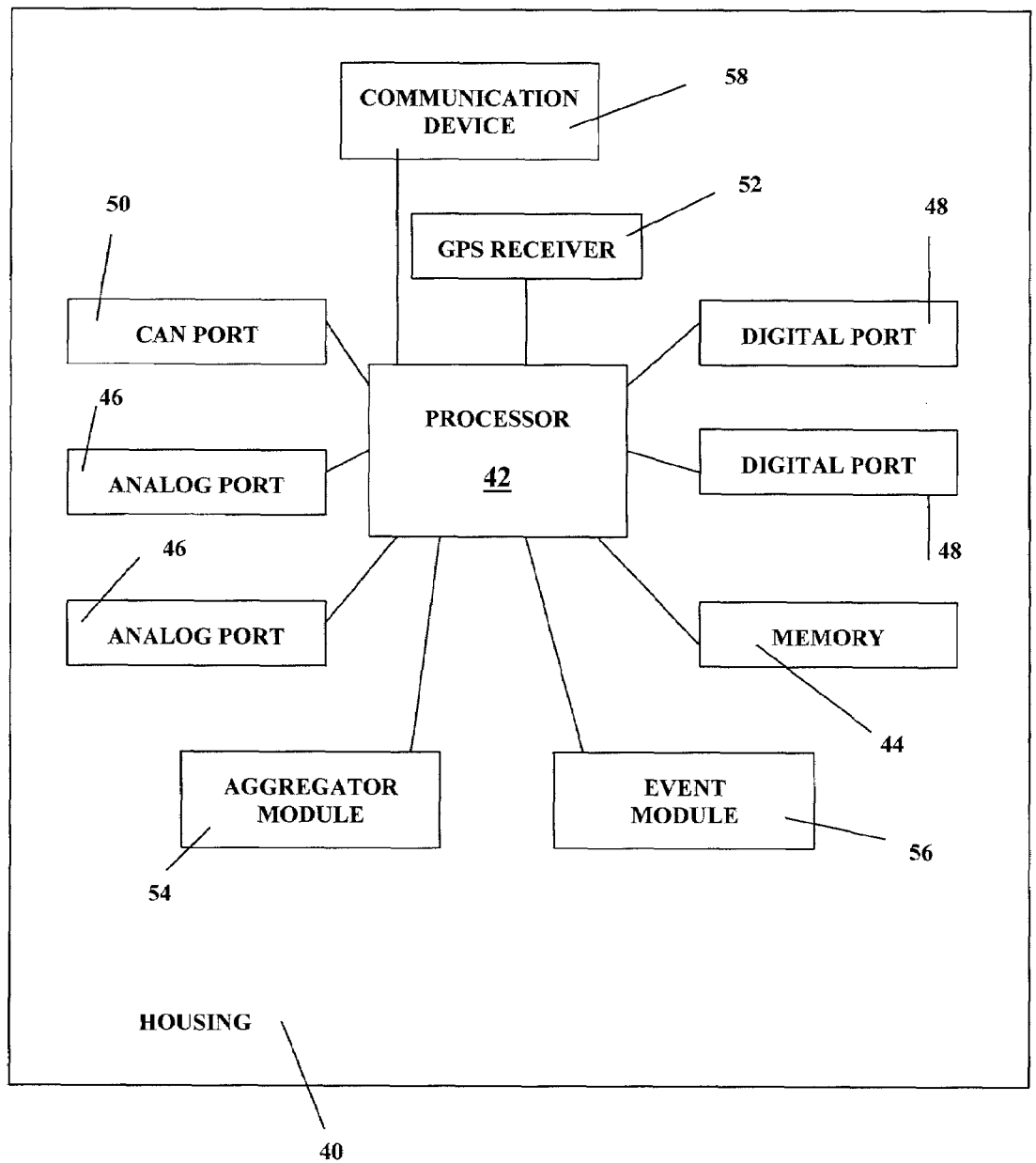
FIG. 2 is a block diagram of a data acquisition unit useful with the system of FIG. 1.

The data acquisition unit 26 can assume a wide variety of forms best suited for the device 22 to which it is assembled along with the operational parameters of interest. With this in mind, FIG. 2 illustrates one embodiment of the data acquisition unit 26 in accordance with aspects of the present disclosure. The data acquisition unit 26 includes a housing 40 maintaining a processor or controller 42, a memory or cache 44, one or more optional analog input ports 46, one or more optional digital input ports 48, an optional CAN input port 50, an optional GPS receiver 52, an aggregator module 54, an event module 56, and a communications device 58. Other sensor input ports (not shown) can also be provided, such as one or more USB ports, one or more UART serial ports, etc. In general terms, the processor 42 receives and processes and/or manages data or information acquired at the ports 46-50 and the GPS receiver 52 pursuant to protocols dictated by the aggregator module 54 and/or the event module 56, and stores the so-generated information in the memory 44. Further, the processor 42 is electronically coupled to the communication device 58, prompting operation of the communication device 58 to transmit data to an external server 30 (FIG. 1), as well as operating in response to commands received at the communication device 58. Various components of the data acquisition unit 26 are powered and regulated by a power module (not shown) carried within the housing 40 that is otherwise adapted for electrical connection to a power source (e.g., a battery) normally provided with the device 22 (FIG. 1). With this one embodiment, then, the power module accounts for uncertain power levels commonly associated with the device power source. Alternatively, other techniques for powering the data acquisition unit 26 are also acceptable.

The housing 40 is sized and shaped in accordance with the device 22 (FIG. 1) to be monitored. In some embodiments, the housing 40 forms a sealed (e.g., water proof) enclosure about the components 42-58. To this end, the processor 42 in combination with the aggregator module 54 and the event module 56 are adapted to minimize the amount of intelligence (and thus physical size of various electronic components) required for acquiring desired data, while leveraging other components of the system 20 (FIG. 1) for more powerful data analysis and processing. As a result, the housing 40 can be of a relatively small size as compared to conventional data loggers, for example at a form factor on the order of 4.5 inches by 4 inches by 2 inches, although a wide variety of other sizes (either greater or lesser) are also acceptable.

The processor 42 can assume a variety of forms known in the art or in the future developed (e.g., a processor chip or chip set, a multicore processor, etc.) appropriate for performing the data acquisition and processing steps described below, and can include a microprocessor as known in the art. In some embodiments, the processor 42 maintains or is programmed to operate upon a personal computer operating system (e.g., Linux Operating System). Further, the processor 42 is programmed (or electronically linked to an appropriate module) to dictate polling of information from the various ports 46-50 and the GPS receiver 52 at desired, disparate rates (e.g., at default rates or at rates selected by a user). As a point of reference, while FIG. 2 illustrates the modules 54, 56 as being provided apart from, and electronically coupled to, the processor 42, in other embodiments the processor 42 can include (e.g., be programmed with logic associated with) the modules 54, 56. In addition, the processor 42 can be electronically coupled to, or otherwise be programmed to operate upon, other components or modules not shown, such as a counter and/or timer/clock, etc.

The memory 44 can also be of any type currently known or in the future developed, and can be provided as part of the processor 42 architecture or can be an external component. Thus, the memory 44 can be or include a memory cache (e.g., DRAM or Compact Flash), although other electronic components capable of storing information are also acceptable.

The analog input ports 46 are generally configured to establish an electrical connection with a corresponding analog sensor (not shown, but described above). The one or more analog input ports 46 can assume any form known, and thus can be a mechanical/physical connector, wireless connector, etc. In fact, in some optional embodiments, one or more of the analog input ports 46 is a hard wired (or more permanent) connection to the corresponding analog sensor. Regardless, the analog input port(s) 46 establish an electronic/communicative link between the processor 42 and the sensor (not shown) associated with (connected to) the analog input port 46 such that the processor 42 receives data generated or signaled by the sensor, with the data being indicative of a parameter being sensed by the sensor. While FIG. 2 illustrates two of the analog input ports 46, in other embodiments, more or less (including none) of the analog input ports 46 can be provided. For example, in one non-limiting configuration, the data acquisition unit 26 includes eight-sixteen of the analog input ports 46. As a point of reference, the types of analog sensors useful with the system 20 (FIG. 1) can vary greatly as indicated above. In this regard, the analog input ports 46 are preferably universal ports, able to establish an electronic link to any analog sensor type.

Similarly, the digital input ports 48 are generally configured to establish an electrical connection with a corresponding digital sensor (not shown, but described above). The one or more digital input ports 48 can assume any form known, and thus can be a mechanical/physical connector, wireless connector, etc. In fact, in some alternative embodiments, one or more of the digital input ports 48 is a hard wired (or more permanent) connection to the corresponding analog sensor. Regardless, the digital input port(s) 48 establish an electronic/communicative link between the processor 42 and the sensor associated with (connected to) the digital input port 48 such that the processor 42 receives data generated or signaled by the sensor, with the data being indicative of a parameter being sensed by the sensor. While FIG. 2 illustrates two of the digital input ports 48, in other embodiments, more or less (including none) of the digital input ports 48 can be provided. For example, in one non-limiting configuration, the data acquisition unit 26 includes eight of the digital input ports 48. As a point of reference, the types of digital sensors useful with the system 20 (FIG. 1) can vary greatly as indicated above. Thus, the digital input ports 48 are preferably universal ports, able to establish an electronic link to any digital sensor type.

Where provided, the CAN port 50 can also be of a type known in the art and is adapted to establish an electronic communicative link between the processor 42 and a corresponding CAN bus provided with device 22 (FIG. 1). As a point of reference, CAN bus architecture is standard for certain types of devices 22 with which the system 20 (FIG. 1) is useful, such as vehicles. In this regard, the data acquisition unit 26 can include additional components or features useful for interfacing with the CAN bus, such as a converter for translating CAN bus protocol to serial, CAN communication features including listen only, CAN 2.0a or 2.0b compatibility, user-defined message requests, individual channel filtering, etc. In other embodiments, the CAN port 50 can be eliminated.

Where provided, the GPS receiver 52 is of a type known in the art, and can be located internally within the housing 40. The GPS receiver 52 serves as a discrete sensor or source of data, and is in electronic communication with the processor 42 such that information signaled by the GPS receiver 52 is received and processed by the processor 42. In other embodiments, the GPS receiver 52 can be provided apart from the data acquisition unit 26 (e.g., the data acquisition unit 26 can include a GPS port adapted to establish an electronic link to a GPS receiver otherwise provided with the device 22 (FIG. 1) being monitored); even further, the GPS receiver 52 can be eliminated.

As alluded to above, a wide range of disparate sensor inputs are provided to the processor 42. The aggregator module 54 operates to correlate the disparate data streams with one another in a manner minimizing requisite space of the memory 44, yet resulting in meaningful reporting information. In general terms, the aggregator module 54 can be software programmed to the processor 42, or can be a standalone module that is electronically coupled to the processor 42. Regardless, the aggregator module 54 dictates, at least in part, which sensor information is ultimately stored in the memory 44, in what format, and when they are logged. More particularly, the aggregator module 54 establishes a common basis for the simultaneously received sensor inputs (e.g., time basis), and filters or establishes a more compact representation of sensor data for sensors exhibiting a higher sampling rate as compared to others of the sensors 24 (FIG. 1). In this way, all data from sensor(s) 24 being sampled and/or generating sensor information at highly elevated rates or speeds need not be stored in the memory 44; instead, a summary or grouping of sensor information is generated and stored over a designated time interval that is commensurate with the sampling rate capabilities of all the sensors 24. Further, a timestamp or counter can be associated with the set of sensor data (or data summary or grouping) at each interval.

Figure 3:
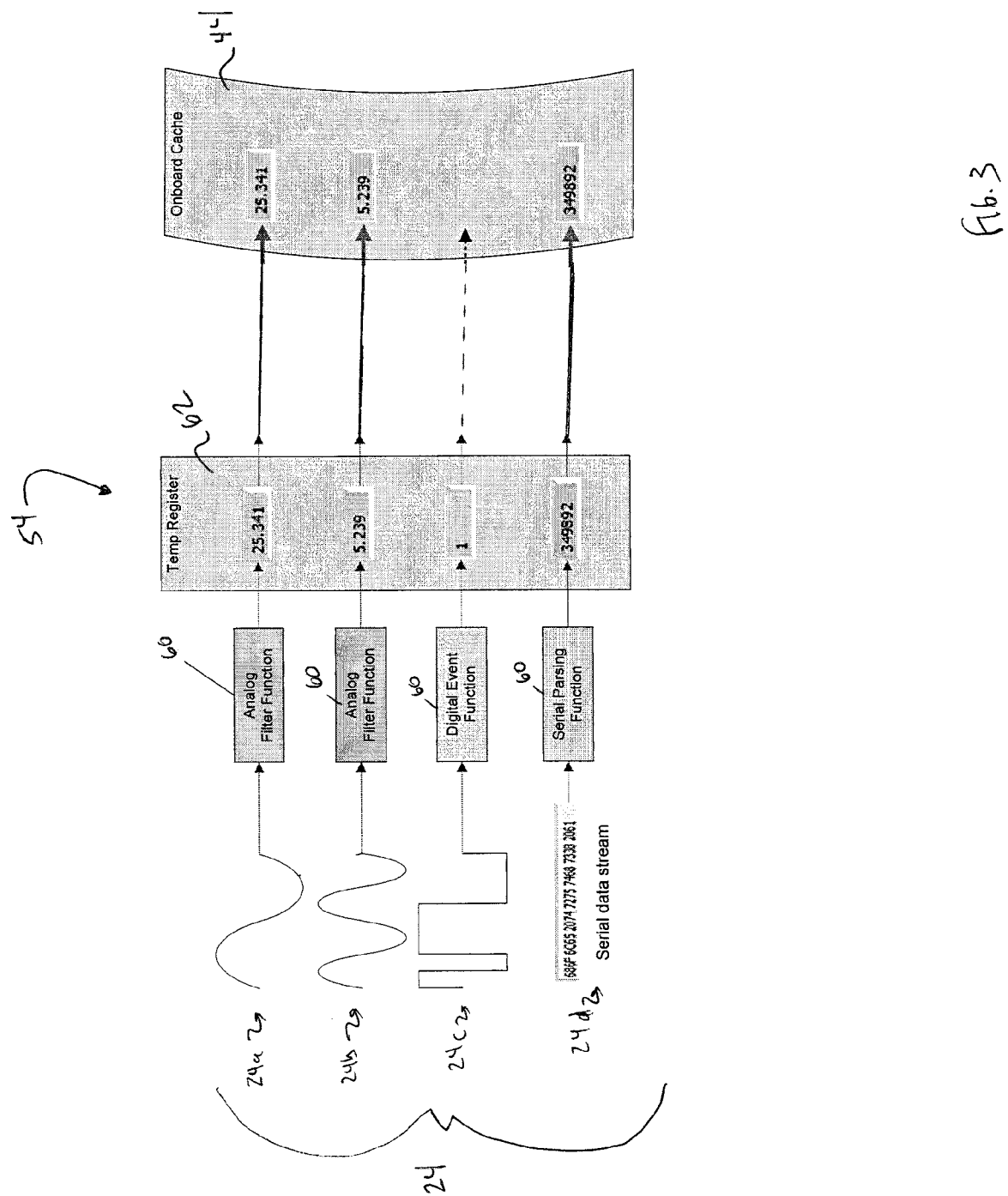
FIG. 3 is a simplified illustration, in block form, of a portion of the data acquisition unit of FIG. 2, including an aggregator module.

In some embodiments, and with additional reference to FIG. 3, the aggregator module 54 is programmed to perform or provide a filter function 60 with one, two, or all, of the sensor 24 (referenced generally). As a point of reference, FIG. 3 illustrates representative signaled sensor data from a first analog sensor 24*a*, a second analog sensor 24*b*, a digital sensor 24*c*, and a serial sensor 24*d* (e.g., a CAN bus converted to serial format), it being understood from the above that a wide variety of other sensor inputs are equally acceptable (e.g., a GPS sensor input). With the representation of FIG. 3, the analog sensors 24*a*, 24*b* are generating information (or is being sampled at) a first rate. Further, the digital sensor 24*c* is signaling information in a format and rate disparate from that of the analog sensors 24*a*, 24*b*, as is the serial sensor 24*d* (as well as possibly other non-analog sensors or data sources provided with the system 20 (FIG. 1)). With the above in mind, the filter function 60 summarizes or groups the signaled information from at least some of the sensors 24*a*-24*d*.

In some embodiments, the analog sensor 24*a*, 24*b* information is analyzed and reduced to a more manageable and representative data point(s) by the aggregator module 54. For example, the filter function 60 can reduce the analog sensor 24*a*, 24*b* information to a minimum value, a maximum value, and an average value over the designated time interval. Other representative date points can alternatively or additionally be generated and stored (e.g., data points outside of a threshold limit, mean value, etc.). With this approach, then, where the analog sensor 24*a*, 24*b* is signaling captured information at exceedingly high rates (e.g., 5 kHz), only small number of representative data points are possibly available for storage in the memory 44 for each time interval (e.g., once per second, the aggregator module 54 reviews the signaled information from the first analog sensor 24*a*, determines a maximum value, minimum value, and average value over that second, and makes the values available for storage in the memory 44).

In some embodiments, it may be unnecessary to filter signaled information from the digital sensor 24*c* due to the typical "on" or "off" (i.e., 1 or 0) output generated by digital sensors. In other embodiments, however, the filter function 60 can operate to filter or summarize information from the digital sensor 24*c* over the designated time interval. For example, the filter function 60 can operate to retrieve information from the digital sensor 24*c* only in instances where a state value of the digital sensor 24*c* information changes during the designated time interval.

Similarly, the filter function 60 may or may not operate upon the information generated by the serial sensor 24*d*. For example, the filter function 60 can perform a parsing operation upon the data stream signaled by the serial sensor 24*d*, parsing out only desired information or data point(s). By way of reference, where the serial sensor 24*d* is or includes a CAN bus (the output of which is converted to a serial format), a wide range of operational information may be represented in the data stream, a majority of which is of little or no interest to an end user. Under these circumstances, the filter function 60 can operate to retrieve only a portion of the serial data stream that otherwise relates to the parameter(s) of interest. The filter function 60 can also generate interpolated data based on values sensed from any combination of the sensors 24*a*-24*d*.

The designated time interval over which the filter function 60 operates can be determined in a number of different ways. In some embodiments, the designated time interval is a user-determined value that is implemented as a default value programmed to the aggregator module 54, or as a user-entered command delivered to the processor 42 and ultimately acted upon by the aggregator module 54. In other embodiments, the aggregator module 54 can operate to determine an appropriate designated time interval based upon an evaluation of the capabilities of each of the sensors 24 provided with the system 20 (FIG. 1). For example, the aggregator module 54 can poll the sensors 24 otherwise connected to (or provided with) the data acquisition unit 26 and determine a sampling rate capability of each of the sensors 24 (or can poll user-entered sampling rate designations entered by a user for all of the provided sensors 24). The aggregator module 54 then determines which of the sensors 24 has the "slowest" sampling rate (either sampling rate capability or sampling rate as dictated by a user), and designates the sampling interval associated with this so-determined interval as being the designated time interval over which the various filtering operations are performed. Regardless, the designated time interval can be commensurate with the minimum sampling rate presented by the sensors 24 in total, and can be, in some embodiments, approximately one second. Thus, for example, where the designated time interval is one second, the aggregator module 54 performs the filter function described above upon the appropriate sensor information once per second.

Following operation of the filter function 60, the aggregator module 54 can operate to store the summarized or grouped data (or raw data for sensor(s) signaling one data point over the course of the designated time interval) in the memory 44. In other embodiments, the aggregator module 54 operates in connection with a temporary register 62 at which all signaled sensor information is temporarily stored. The temporary register 62 can be a memory-type component of the aggregator module 54, provided with the processor 42, or a standalone component. Regardless, information stored in the temporary register 62 can subsequently be processed or analyzed as described below, during which a decision is made to store or not store some or all of the information from the temporary register 62 in the memory 44.

In addition to the one or more filtering operations described above, the aggregator module 54 is, in some embodiments, adapted or programmed to assign a common timestamp or counter to all of the acquired and, where applicable, summarized or filtered, sensor information at each designated time period, and associated the so-generated timestamp to the correlated information as saved in the memory 44. For example, the aggregator module 54 can make reference to or include a clock or timer that can include date information. In some embodiments, the timer is a UTC referenced date/timestamp device, generating time information in seconds, microseconds, or nanoseconds relative to an assigned starting point. Unless the assigned starting point is exactly correlated with a UTC timestamp, the "timestamp" is only differential, not absolute. With this in mind, in some embodiments, the data acquisition unit 26 is adapted to capture timestamps as absolute UTC-relative (e.g., time zone based) values with a maximum error of 0.1 seconds and a timer resolution of 1 microsecond, although other configurations are also acceptable. Regardless, the aggregator module 54 continuously performs the above protocols over consecutive ones of the designated time intervals, prompting storing/timestamping of sensor data in the memory 44.

Figure 4:
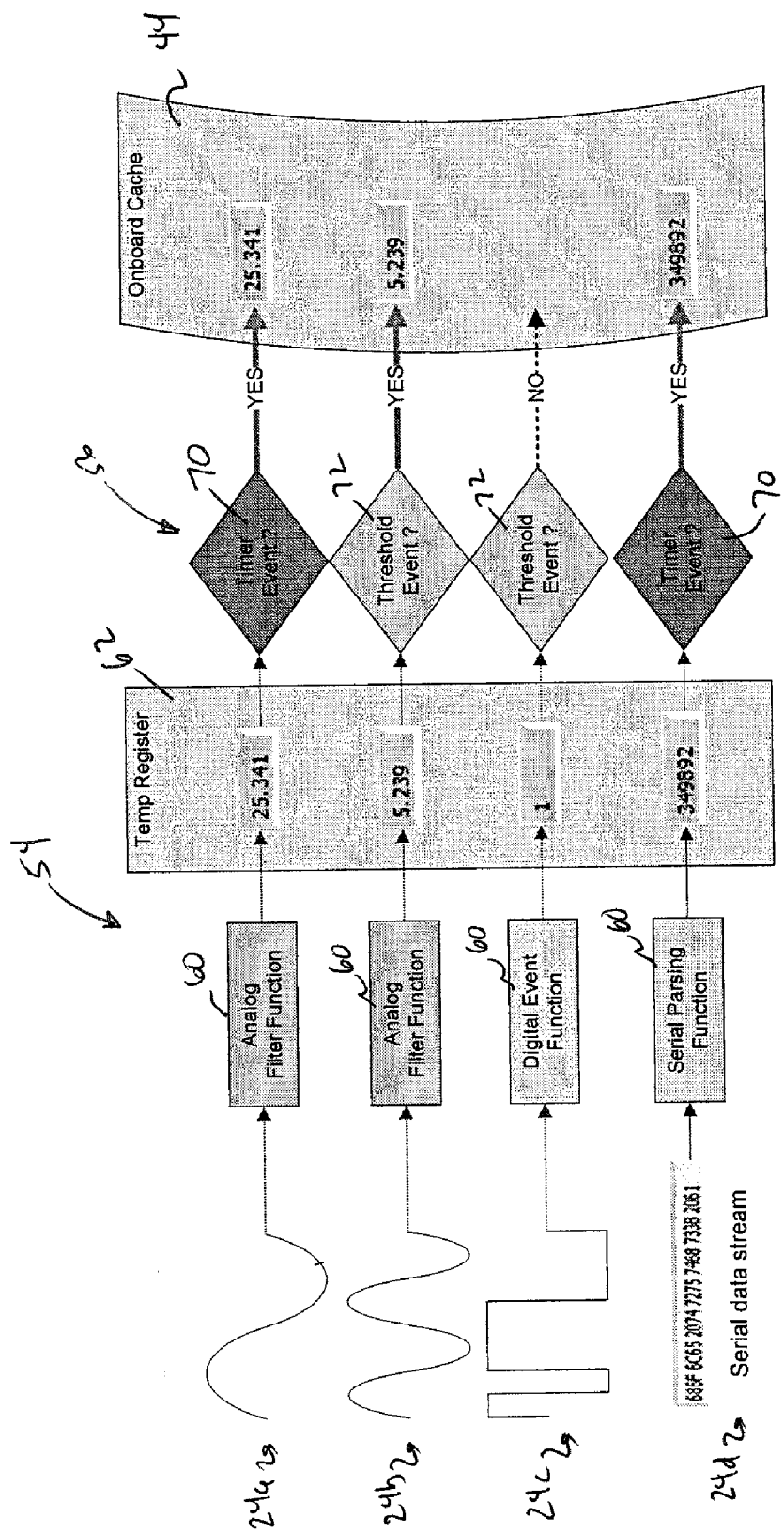
FIG. 4 is a simplified illustration, in block form, of a portion of the data acquisition unit of FIG. 2, including an event module.

Returning to FIG. 2, and with additional reference to FIG. 4, in some embodiments the event module 56 can be provided and effectuates further decisions on when information is stored in the memory 44, the format of the stored information and/or the sensor(s) 24 from which information is stored. In general terms, the event module 56 can be software programmed to the processor 42, or can be a standalone module that is electronically coupled to the processor 42. The event module 56 is adapted or programmed to poll or interrogate data stored in the temporary register 62, and prompt storage of information in the memory 44 pursuant to one or more event functions 70, 72. The event functions 70, 72 represent designated protocols for determining that an "event" has occurred. For example, the event function 70 can be a timer event whereby for certain ones of the sensors 24 (e.g., the first analog sensor 24*a* and the serial sensor 24*d*), each time a predetermined time period has elapsed, the corresponding sensor information (e.g., as filtered by the aggregator module 54) is automatically stored (with a corresponding timestamp) in the memory 44. Parameters of the timer event associated with the event function 70 can differ for each of the sensors 24, can apply to only a selected number of the sensors 24, or can be identical for two or more or all of the sensors 24 provided with the system 20 (FIG. 1). Further, the timer event parameter(s) can be provided as default values with the event module 56 and/or can be set or altered by a user via appropriate commands. In some embodiments, the system 20 can be configured such that an event detected or generated at one data acquisition unit 26 can then cause an "action" that transmits a message to an external receiving device or system, identifying the event and associated data. The receiving device can be the data server 30 (FIG. 1) or another data acquisition unit 26 with a suitably defined event trigger. Events can thus be cascaded across multiple systems, triggering multiple actions at the event recipients.

The event function 72 can be a threshold event whereby upon detection by the event module 56 of data from one of the sensors 24 outside of a threshold limit or range, the event module 56 operates to automatically cause the corresponding sensor data to be saved in the memory 44. As reflected in FIG. 4, the event function 72 is applied to less than all of the sensors 24 (e.g., is provided for the second analog sensor 24*b* and the digital sensor 24*c*), but in other embodiments, can be provided for all of the sensors 24 (alone or in addition to a corresponding timer event function 70). The threshold parameters or limits associated with each sensor 24 otherwise having one of the threshold event functions 72 can be provided as default values, and/or can be set or altered by a user via user-entered commands.

With some configurations, the event module 56 is adapted or programmed to prompt storage of the full trace of information signaled by the sensor 24 otherwise determined to have signaled information indicative of a threshold event over an event time period. In other words, for one or more of the sensors 24, where the sensor 24 in question is deemed to have "sensed" data outside of the corresponding threshold range/limits, the event module 56 operates to store in the memory 44 an unfiltered representation of all information received from that sensor 24 over an event time window surrounding the time of the threshold event occurrence (in addition to or instead of the summarized/grouped representation of the data as generated by the aggregator module 54). For example, where the threshold event function 72 determines that the second analog sensor 24*b* has signaled information outside of a corresponding threshold range at a time t, the event module 56 causes the entire stream of data from the second analog sensor 24*b* over the event time window (i.e., t+/−n, where n is a default value or designated by the user, and can be on the order of 1-10 seconds) to be saved in the memory 44. Even further, upon determining that one of the sensors 24 is sensing information outside of the corresponding threshold limits, the event module 56 can prompt the memory to store full, unfiltered data streams from two or more or all of the sensors 24. Regardless, the threshold event function 72 operates to provide the end user with a more complete representation of sensor information, thus allowing the user to more easily ascertain the cause of the threshold event.

Returning to FIGS. 1 and 2, the communication device 58 can assume a wide variety of forms, appropriate for establishing a communicative link with the user interface 28. In some embodiments, the communication device 58 facilitates wireless communication with the user interface 28, the data server 30, and the communications device 32 (where provided), such as WiFi (802.11), Zigbee, cellular (GSM/GPRS, CDMA/ECDMA), etc. To this end, the system 20 can further include additional components necessary for effectuating a desired wireless interface (e.g., can include a wireless base station (not shown) that receives and transmits information from the communication device 58 to the user interface 28 via a known medium, for example the internet). In other embodiments, the communications device 58 is adapted to provide a direct or wired link with the user interface 28, for example via an ethernet port. Even further, the communications device 58 can be adapted to facilitate both wired and wireless links. Regardless, the communications device 58 is electronically coupled to the processor 42, transmitting information from the memory 44 as prompted by the processor 42 to the user interface 28, the data server 30, and the communications device 32 (where provided), as well as, in some embodiments, transferring user-entered command prompts from the user interface 28 to the processor 42.

Commensurate with the above explanation, the user interface 28 and the data server 30 can assume a variety of forms, and in some embodiments, the system 20 is configured to interface with two or more different user interface 28 and/or data server 30 formats. For example, with some configurations, the data server 30 is maintained at a facility remote of the device 22/data acquisition unit 26, and can be periodically linked to the user interface 28 (e.g., a personal computer). The data server 30 can process data from the data acquisition unit 26 in various manners as described below, can save the received data and/or processed information in a database, and/or can transmit the data/information to the user interface 28 and/or a separate work station (e.g., lap top computer, desk top computer, etc.). The user interface 28 can be a personal computer or similar computing device such as a hand-held computing device.

Regardless of form, in some embodiments, the user interface 28 is adapted or programmed to prompt delivery of stored information from the data acquisition unit 26. To this end, the system 20 can be configured such that information is only transmitted to the user interface 28 in response to a received "send" command from the user interface 28. Additionally or alternatively, the data acquisition unit 26 can be adapted or programmed to automatically transmit, or attempt to transmit, stored information at predetermined time intervals (e.g., nightly).

Figure 5:
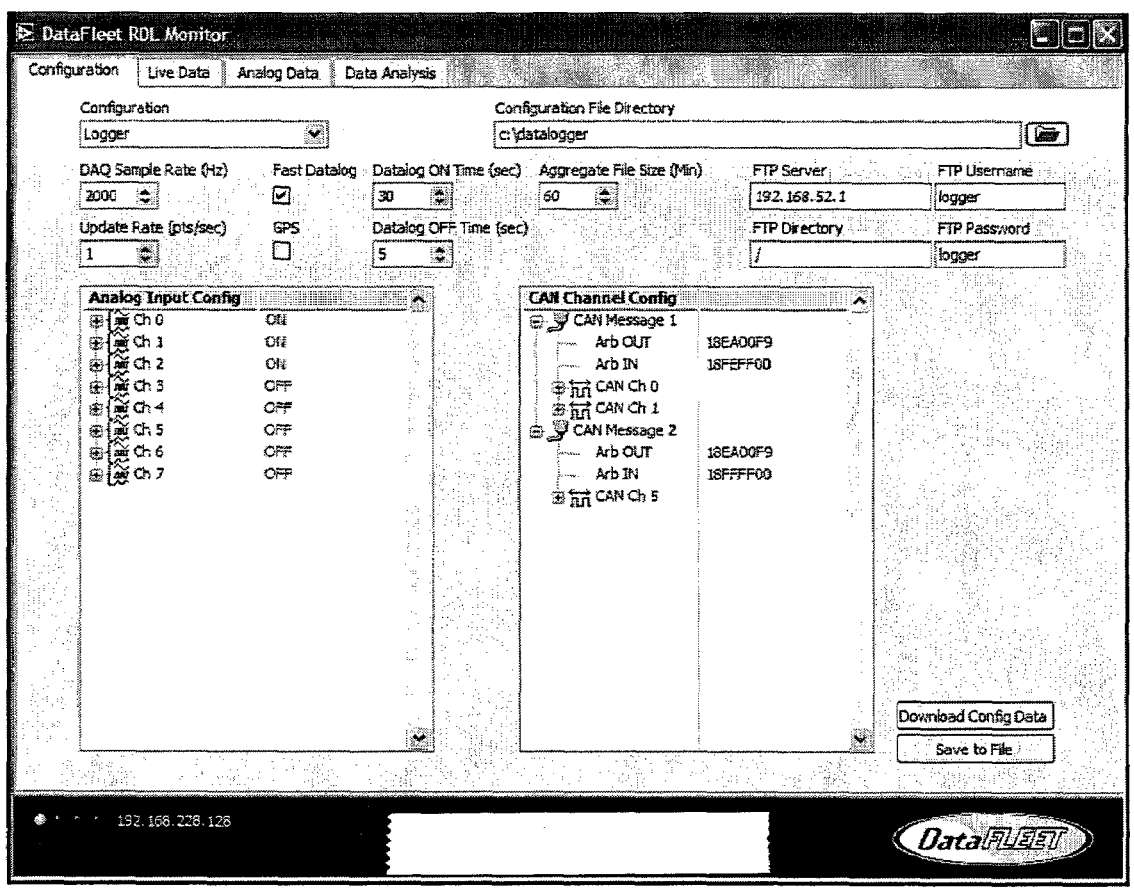
FIGS. 5-8 are representative screen shots of displays generated by a user interface useful with the system of FIG. 1.
Figure 6A:
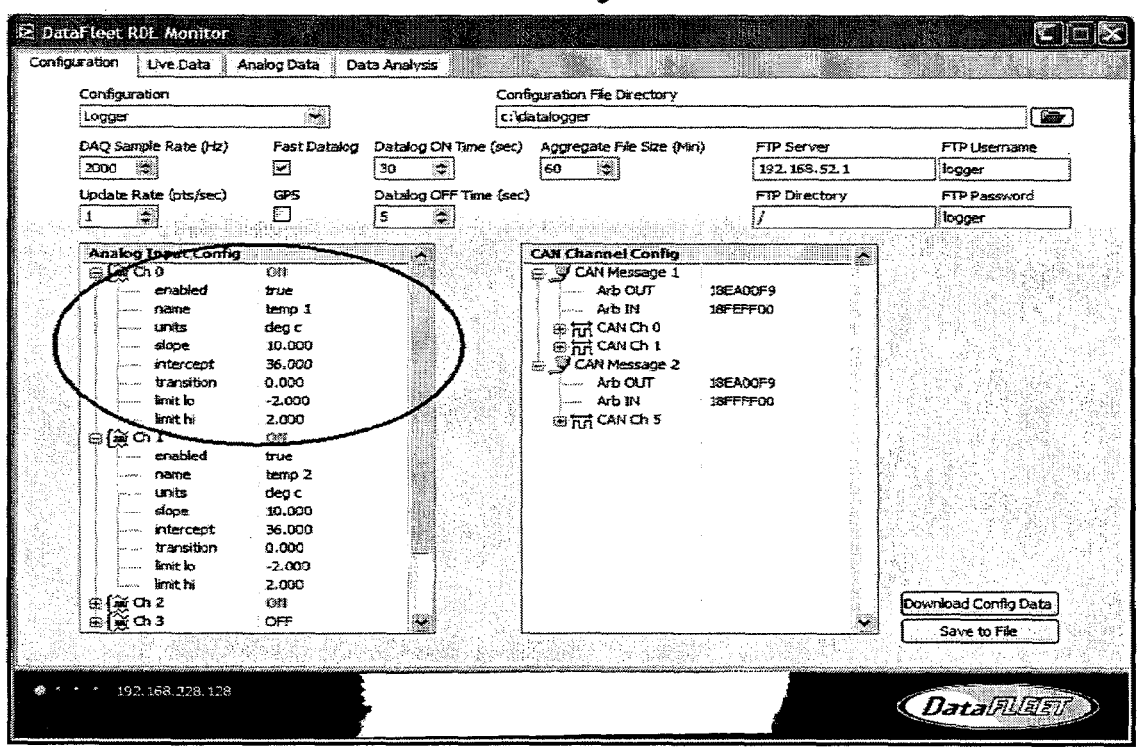
Figure 6B:
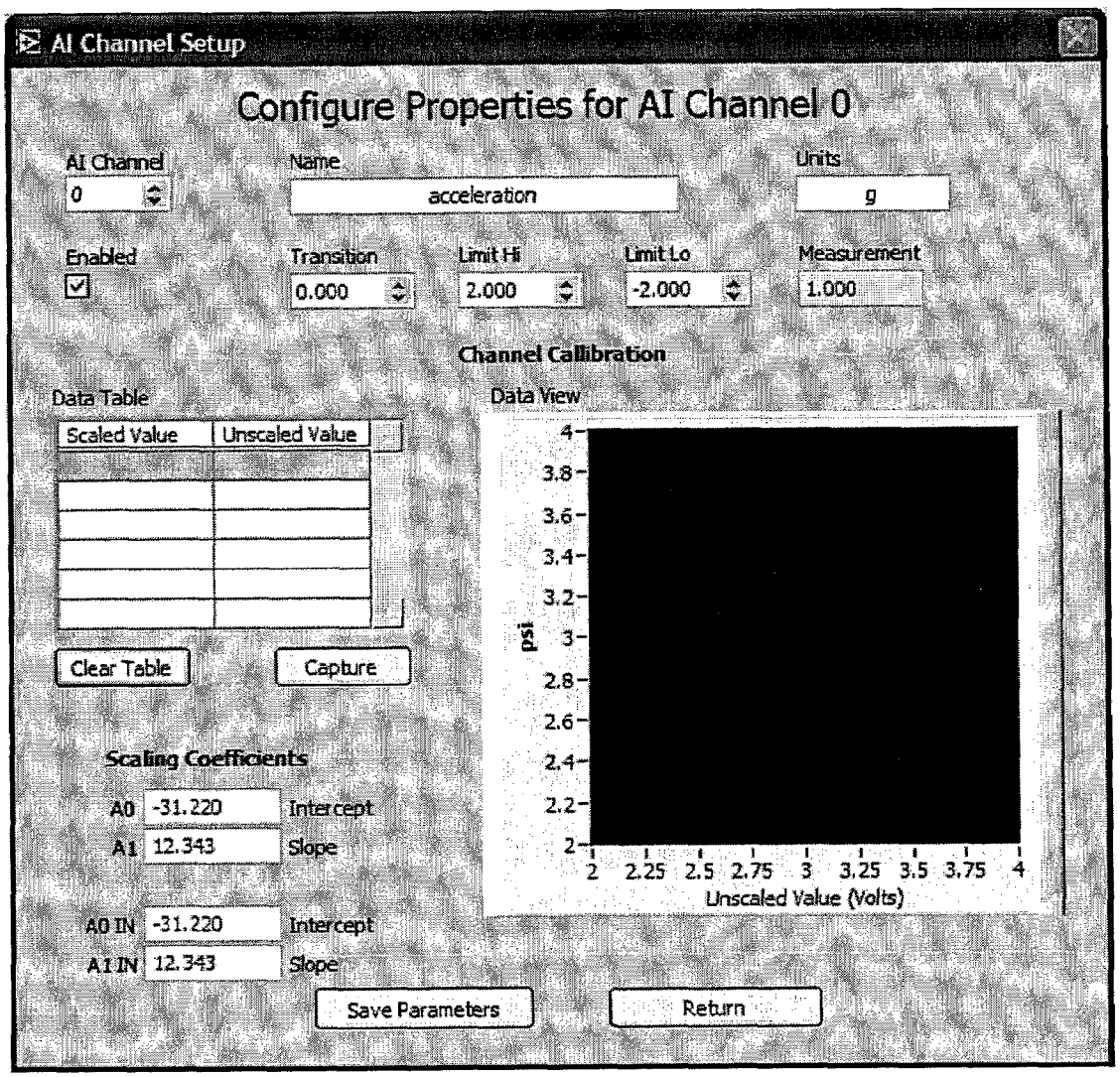

In addition to the above, the user interface 28 can be configured to display information from or about the data acquisition unit 26 in various modes. For example, FIG. 5 provides a representative screen shot of a display 100 generated by the user interface 28. In particular, the display 100 relates to a current configuration of the data acquisition unit 26 (e.g., number and types of sensors, sampling rates, storage configurations, threshold limits, aggregation rates, etc.). Along these lines, the user interface 28 can provide the user with the ability to select or change one or more parameters associated with the data acquisition unit 26. For example, FIG. 6A is a representative screen shot of a display 102 generated by the user interface 28, and includes information relating to a configuration of various ones of the sensors (designated as "channels" or "Ch" in the display 102). Upon selecting a desired sensor or channel (e.g., "Ch 0" in FIG. 6A), the user interface 28 operates to present the user with a more complete representation of the sensor configuration as shown by the representative screen shot display 104 of FIG. 6B. By entering desired commands into the user interface 28 at the configuration display 104, one or more parameters associated with the selected sensor 24 can be selected or altered by the user. For example, the sensor "name," units, scaling constants, etc., can be entered or altered. Upon confirming the selected or altered parameter(s), the user interface 28 operates to transmit the configuration information to the data acquisition unit 26 for subsequent application by the processor 42 as described above.

Figure 7A:
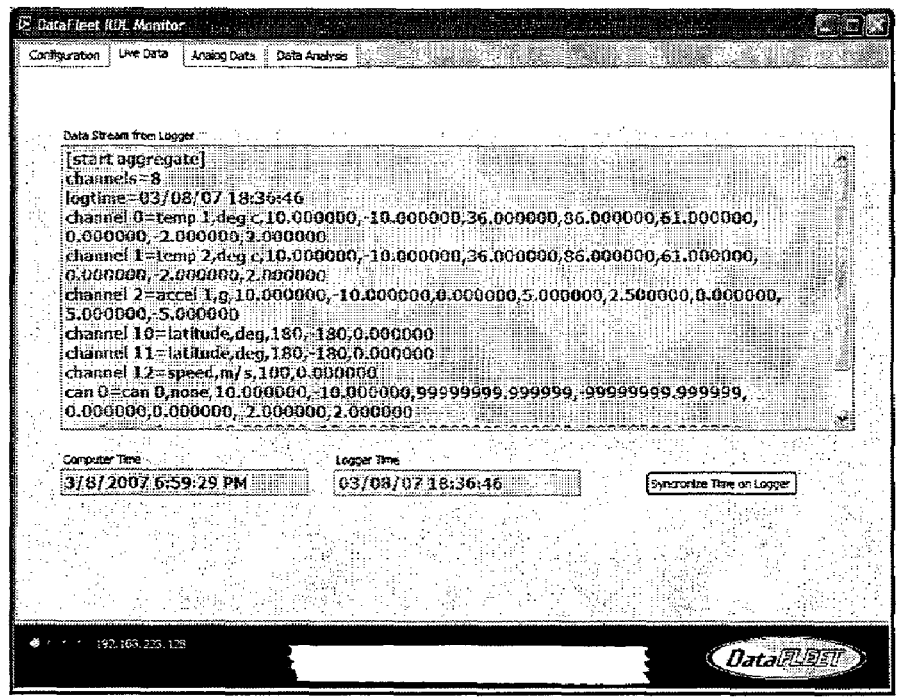
Figure 7B:
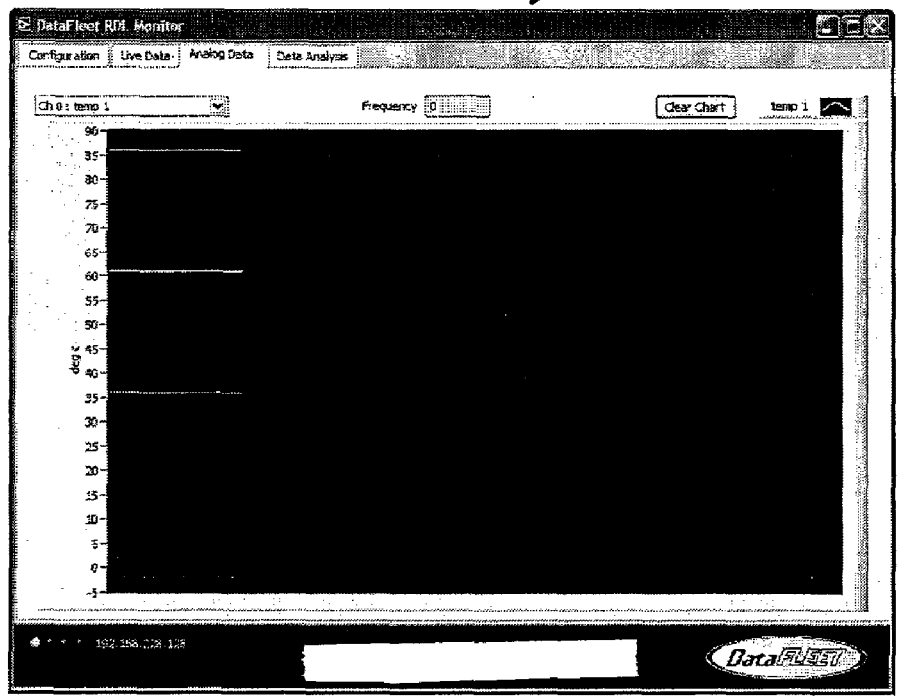

Other display formats can be provided with the user interface 28. FIGS. 7A and 7B are representative screen shots of user interface-generated displays 106, 108 providing real time information for one or more selected sensors (when the user interface 28 and the data acquisition unit 26 are otherwise communicatively linked). The display 106 provides a listing of all current (e.g., filtered) data in numerical form. Conversely, the display 108 is an analog, real time representation of current information being generated by the selected sensor, and may further include any filtered information as described above.

Figure 8:
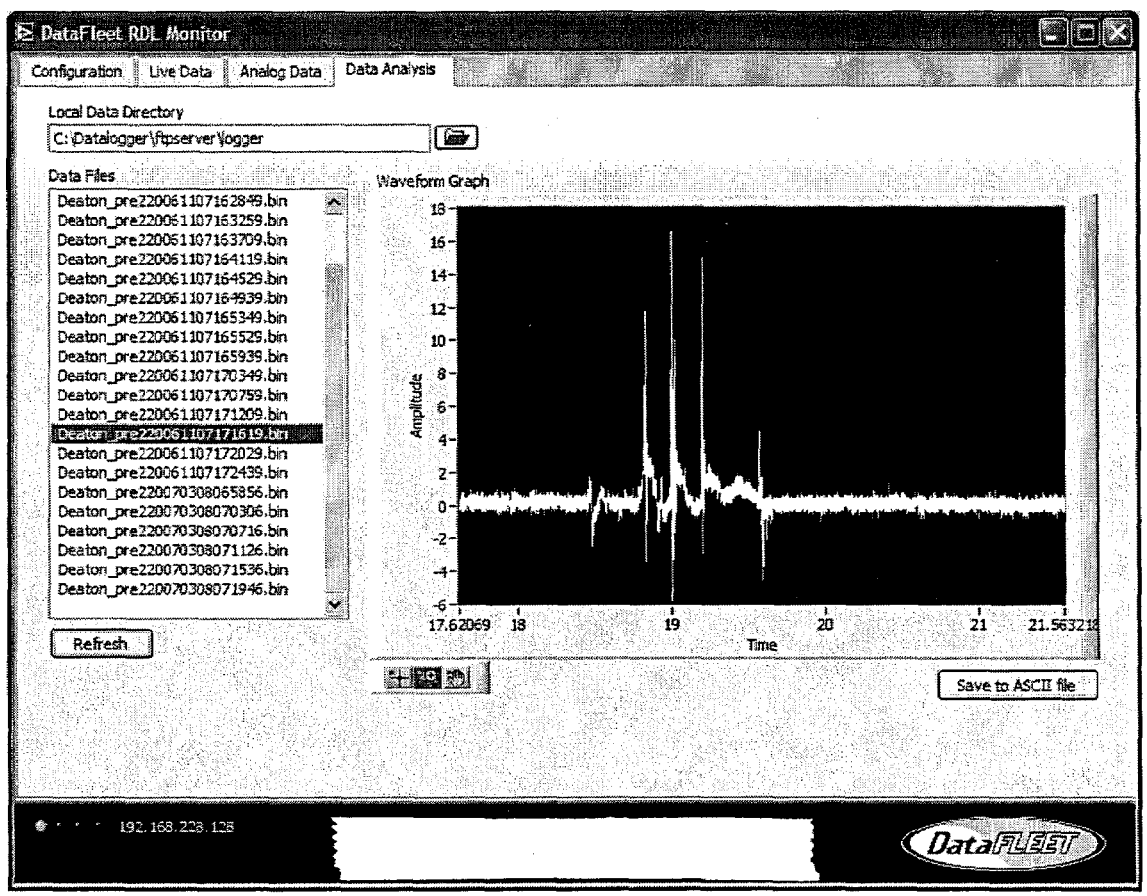

In addition, the user interface 28 can optionally be adapted or programmed to generate and display an analysis of the information generated and stored by the data acquisition unit 26. For example, FIG. 8 provides a representative screen shot of a display 110 generated by the user interface 28 in some embodiments, and provides a user with the ability to select a sensor of interest and displays, in graphical form, the corresponding sensor information. In addition, the user interface 28 can be adapted to allow a user to save the selected sensor data in other formats, such as an ASCII text file. Other analysis and/or reporting tools can be included with the user interface 28 and/or the data server 30.

In contrast to the user interface 28 that otherwise provides temporary representation of acquired data, the data server 30 serves to permanently save and organize all acquired information. The data server 30 can be programmed with appropriate software to generate a variety of different summaries or reports/analysis of data acquired over long periods of time. In some embodiments, the system 20 is configured such that the data acquisition unit 26 systematically downloads acquired and stored information to the data server 30 on a regular basis, with the data server 30 effectively serving as a blind receiver. Once a data download to the data server 30 is complete, the memory 44 (FIG. 2) of the data acquisition unit 26 can be partially or completely cleared of previously acquired data, thus providing sufficient memory space for storage of additional, newly acquired (and possibly filtered) information. When desired, a user can access the stored information and any reports generated by the data server 30, for example via the user interface 28.

The data acquisition systems and related methods of operation of the present disclosure provide marked improvements over previous designs. Remote logging of data or information from multiple, disparate sensors (having different data formats) is achieved, the data or information being stored in an on-board cache or memory in a very compact and orderly fashion such that it can be uplinked, repackaged, and decoded on the user interface. Further, the format in which the on-board acquisition unit records information and/or the type of information being recorded can be remotely managed via commands wirelessly communicated from the user interface. The system is useful with a plethora of different devices, ranging from vehicles to industrial equipment to personal products.

Although the present invention has been described with reference to preferred embodiments, workers skilled in the art will recognize that changes can be made in form and detail without departing from the spirit and scope of the present invention.

What is claimed is:

1. A data acquisition system comprising:
    an electronic data acquisition unit including:
        a housing,
        a first input port maintained by the housing and adapted for electrical connection to, and for receiving a first data signal generated by, a first sensor,
        a second input port maintained by the housing and adapted for electrical connection to and for receiving a second data signal generated by, a second sensor,
        a processor maintained by the housing and electronically connected to the first and second input ports such that the processor receives the first data signal and the second data signal from the first and second input ports, respectively,
        an aggregator module maintained by the housing and in electronic communication with the processor, the aggregator module programmed to correlate information of the first data signal as received from the first input port with information of the second data signal as received from the second input port based on time under circumstances in which a format of the first data signal differs from a format of the second data signal, including operating a filter function in which the aggregator module reduces content of the first data signal as received at the first input port,
        a communication device maintained by the housing and adapted to transmit information generated by the aggregator module to a location remote of the housing.

2. The system of claim 1, wherein the system further includes the first sensor and the second sensor, and further wherein the first sensor is an analog sensor and the second sensor is selected from the group consisting of a digital sensor, a common area network bus, a UART serial bus, and a GPS sensor.

3. The system of claim 1, wherein the aggregator module is programmed to operate the filter function when a sampling rate of the first data signal differs from a sampling rate of the second data signal.

4. The system of claim 3, wherein under a condition where the sampling rate of the first data signal from the first input port is faster than the sampling rate of the second data signal from the second input port, the aggregator module is programmed to:
    group information in the first data signal based upon a designated interval.

5. The system of claim 4, wherein the designated interval corresponds with the sampling rate of the second data signal.

6. The system of claim 4, wherein the aggregator module is further capable of:
    assigning a common time basis to the grouped information of the first data signal and the information of the second data signal for each of consecutively occurring ones of the designated intervals.

7. The system of claim 6, wherein the system further includes the first sensor, the second sensor, and a third sensor, and further wherein each of the first, second and third sensors is electronically coupled to the data acquisition unit, and further wherein the aggregator module is capable of assigning the common time basis to a respective group of information from each of the first, second, and third sensors.

8. The system of claim 4, wherein the grouped information is a summary of information contained in the first data signal over the designated interval.

9. The system of claim 8, wherein information contained in the first data signal over the designated interval includes a multiplicity of data points, and further wherein the summary of information includes a maximum data point, a minimum data point and an average of the multiplicity of data points.

10. The system of claim 4, further comprising:
a memory electronically coupled to the aggregator module for storing information generated by the aggregator module.

11. The system of claim 10, further comprising an event module electronically coupled to the processor and the memory, the event module programmed to:
detect occurrence of a predetermined event in the first data signal; and
prompt the processor to store an entirety of the first data signal in the memory over an event window time period.

12. The system of claim 11, wherein the predetermined event is defined by a user.

13. The system of claim 11, wherein event module is programmed to designate occurrence of a predetermined event upon determining that information embodied by the first data signal is outside of threshold limits.

14. The system of claim 13, wherein the event module is further programmed to determine the threshold limits based upon a trend analysis of information embodied by the first data signal.

15. The system of claim 11, wherein the processor is programmed to send a message via the communication device identifying the detected occurrence of the predetermined event.

16. The system of claim 1, further comprising:
a data server located remote of the data acquisition unit and including a receiver adapted to interface with the communication device.

17. The system of claim 16, wherein the receiver and the communication device are adapted to wirelessly interface.

18. The system of claim 1, further comprising:
a user interface located remote of the data acquisition unit, the user interface adapted to interface with the communication device and to generate user-created commands relating to operation of the data acquisition unit.

19. The system of claim 18, wherein the system is configured such that a user can remotely program an acquisition unit operational parameter selected from the group consisting of sensor sampling rate, threshold limit, aggregation rate, and sensor configuration via the user interface unit.

20. The system of claim 1, wherein the processor includes a personal computer operating system.

21. The system of claim 1, wherein the data acquisition unit is configured to be installed to a vehicle and at least the first sensor is provided with the vehicle.

22. The system of claim 1, wherein the first input port is an analog port adapted to receive an analog signal, the second input port is a non-analog port adapted to receive a non-analog signal, and further wherein the aggregator module is programmed to correlate analog and non-analog signaled information received at the first and second input ports, respectively.

23. The system of claim 1, wherein the aggregator module is programmed to continuously correlate data received at the first input port with data received at the second input port under conditions in which a rate of data delivery to the first input port is faster than a rate of data delivery to the second input port.

24. The system of claim 1, wherein the data acquisition unit further includes:
a memory maintained by the housing for storing information of the first and second data signals as acquired data;
wherein the processor is programmed to automatically clear the acquired data from the memory following successful transmission of the acquired data to a location remote of the housing via the communication device.

25. The system of claim 24, wherein the processor is further programmed to confirm data transfer to the location remote of the housing before clearing the acquired data from the memory.

26. A data acquisition system comprising:
an electronic data acquisition unit including:
a housing,
a first input port maintained by the housing and adapted for electrical connection to, and for receiving a first data signal generated by, a first sensor,
a second input port maintained by the housing and adapted for electrical connection to, and for receiving a second data signal generated by, a second sensor,
a processor maintained by the housing and electronically connected to the first and second input ports such that the processor receives the first and second data signals from the first and second input ports, respectively,
an aggregator module maintained by the housing and in electronic communication with the processor, the aggregator module programmed to:
reduce a multiplicity of data points in the first data signal over a designated interval to a maximum data point, a minimum data point and an average,
correlate the reduced multiplicity of data points with information of the second data signal based on time,
a communication device maintained by the housing and adapted to transmit information generated by the aggregator module to a location remote of the housing.

27. The system of claim 26, further comprising:
the first sensor connected to the first input port; and
the second sensor connected to the second input port.

* * * * *